Oct. 30, 1928.
W. J. ALBERSHEIM
1,689,659
SPECIFIC GRAVITY INDICATOR
Filed Nov. 13, 1925    2 Sheets-Sheet 1
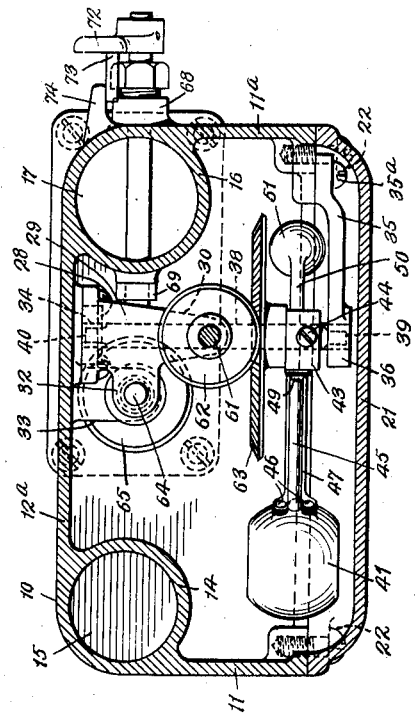
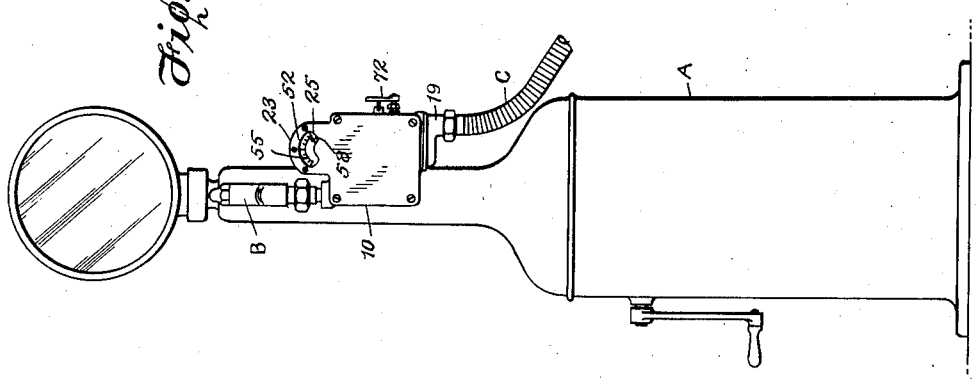
INVENTOR
Walter J. Albersheim
BY
W. T. Criswell
ATTORNEY Oct. 30, 1928.
W. J. ALBERSHEIM
1,689,659
SPECIFIC GRAVITY INDICATOR
Filed Nov. 13, 1925  2 Sheets-Sheet 2
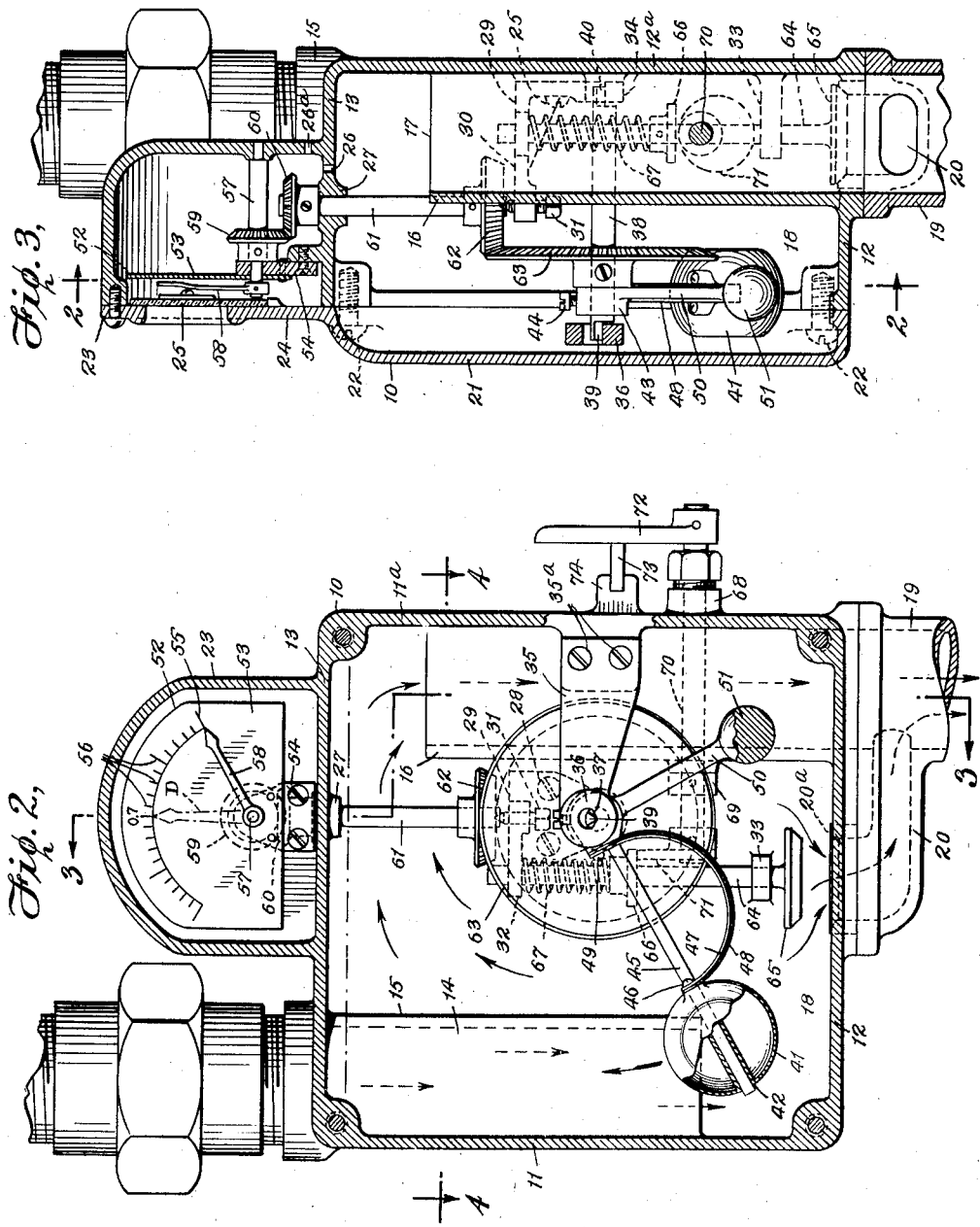
INVENTOR
Walter J. Albersheim
BY
W. T. Criswell
ATTORNEY Patented Oct. 30, 1928.

1,689,659

UNITED STATES PATENT OFFICE.

WALTER J. ALBERSHEIM, OF NEW YORK, N. Y.

SPECIFIC-GRAVITY INDICATOR.

Application filed November 13, 1925. Serial No. 68,865.

This invention relates more particularly to a class of testing apparatus of a modified form of the register disclosed in my co-pending application, serially numbered 68,864, filed November 13, 1925.

My invention has for its object primarily to provide an indicator or device adapted to be used for testing the ratio of density or specific gravity of gasoline and other certain substances with relation to their standard grades or values, in order to enable persons to avoid using adulterated kinds by distinguishing the inferior grades from those of recognized standard qualities, and which may be designed for being employed in conjunction with filling and measuring pumps of gasoline for permitting dealers to display to consumers the grade or value of the product during the dispensing process.

The invention consists essentially of a casing or chamber adapted to be applied to means for conveying a flow of liquid, and the casing has means providing an inlet and an outlet of forms in related positions whereby a portion of the liquid will be retained during its flow through the casing. In the casing is an adjustable rotatively supported counterbalanced displacing body or air chamber of weight whose specific gravity is substantially similar to the specific gravity of the liquid when of a standard density, and this body is submerged in the liquid for being moved by the buoyant effort of the retained liquid in the casing when of a density or specific gravity varying from its known standard. On the casing is an indicating device, and within the casing is means operative by the movement of the displacing body for operating the indicating device to register the relative difference of density of the liquid. The displacing body also has means for being made effective by the influence of change of the standard temperature of the liquid to adjust the displacing body for keeping the indicating device in its normal position at all temperatures of the liquid. In the casing may be an auxiliary outlet leading to the main outlet, and the passage through the auxiliary outlet is controlled by a valve including means operative for moving the valve for enabling the retained liquid to be emptied from the casing subsequent to stopping the flow of liquid through the casing.

A further object of the invention is to provide a specific gravity register of a simple, efficient and durable construction which may be made in appropriate sizes and shapes.

With these and other objects in view, the invention will be hereinafter more fully explained with reference to the accompanying drawings forming a part of this specification in which similar characters of reference indicate corresponding parts in all the views, and will then be pointed out in the claims at the end of the description.

In the drawings, Figure 1 is an elevation, partly fragmentary, of a gasoline filling pump with one form of specific gravity indicator applied thereto.

Fig. 2 is an enlarged detail sectional view, partly in elevation and partly fragmentary, taken on the line 2—2 of Fig. 3.

Fig. 3 is an enlarged detail sectional view, partly in elevation and partly fragmentary, taken on the line 3—3 of Fig. 2, and Fig. 4 is a detail sectional view taken on the line 4—4 of Fig. 2.

The register or apparatus has a casing or chamber 10 which may be of any appropriate size and shape having side walls 11, 11$^a$, a bottom wall 12, a rear wall 12$^a$ and a top wall 13. Interiorly of the casing and extending along part of its side wall 11 is a curved partition or wall, as 14, providing a tubular inlet 15 having its passage leading through the top wall 13, and the partition is of a length so that the lower end of the inlet is spaced above the bottom wall 12 of the casing. In another part of the casing and extending along part of its side wall 11$^a$ is another curved partition or wall, as 16, providing a tubular outlet 17 having its passage leading through the bottom wall 12 of the casing, and the partition 16 is of a length so that its upper end is spaced from the top wall 13 of the casing. These forms of the inlet and outlet with their relative arrangement provide in the casing a chamber 18 for retaining a portion of liquid during its flow through the casing by reason of the liquid being admitted into the lower part of the casing and discharged from the upper part of the casing. On the underside of the bottom wall 12 of the casing may be a pipe 19 which leads from and forms the lower end proper of the outlet 17. Leading into the pipe from the chamber 18 through the bottom wall 12 of the casing is a duct, as 20, providing an auxiliary outlet or valve seat 20$^a$ for discharge of the accumulated liquid in the chamber, as will be hereinafter more fully explained. The side wall 11 of the casing may be formed with an open front which is closed by a plate 21 fastened, at 22, to the side wall, and on top of the casing may be a box or small chamber 23, having a front plate 24 with a glass covered window 25 which is above the front plate 21 of the casing 10. In the top plate 13 of the casing 10 and in the wall of the box 23 are holes or vents 26, 26ª for escapement of air from the interior of the casing.

In the top plate 13 of the casing is a bearing, as 27, having its bore leading into the box or chamber 23. Fastened, at 28, to the rear wall 12ª of the casing between the inlet 15 and the outlet 17 is a bracket, as 29, having an arm 30 protruding toward the center of the interior of the casing, and in the free end of the arm 30 of the bracket 29 is a threaded bore carrying a pivot bolt or screw, as 31, which is arranged with the pointed end of its shank on vertical alinement with the center of the bore of the bearing 27 of the top plate of the casing. Projecting laterally from the arm 30 of the bracket 29 is an arm or bearing, as 32, having its bore on vertical alinement with the center of the auxiliary outlet 20ª of the duct 20. Also extending from the rear wall 12ª of the casing 10 below the bearing 32 of the bracket 29, may be another bearing, as 33, having its bore in register with the bore of the bearing 32 and in register with the auxiliary outlet 20ª. On the bracket 29 under its arm 30 is still another bearing 34, and extending from the side wall 11ª of the casing 10 is a bracket 35 which is secured, at 35ª, to the side wall. On the free end of the bracket 35 is a bearing 36, and this bracket 35 is of such a length that its bearing 36 is on longitudinal alinement with the bearing 34 of the bracket 29.

The lower parts of the walls of the bores of the bearings 34 and 36 are preferably of V-shapes, as 37 Fig. 2, and in the bearings is rotatably supported a beam or shaft 38 having V-shaped or knife edge ends 39, 40 which are seated in the V-shaped parts of the bores of the bearings 34, 36 so that the beam may freely move rotatively. The beam 38 carries a displacing body 41, preferably in the form of a hollow spherical body forming an air chamber, and through the axial center of the displacing body is a hole or opening 42. On the beam 38 is a sleeve 43 which is adjustably held to the beam by a set screw 44, and extending from this sleeve is a bar 45 having its free end part disposed through the opening 42 of the displacing body or air chamber for allowing the body to adjustably move on the bar toward and from the sleeve 43. The displacing body 41 is connected, at 46, to one of the ends of two curved strips, as 47, 48, forming a thermostat, and these strips have their other ends attached, at 49, to the sleeve 43. The thermostat or strips may be of any suitable metals of different caloric extension, such as brass and steel which are soldered or welded together for being expansibly affected by the variation of the temperature of the liquid in the casing to adjust the position of the float 41 on the bar 45, as will be later explained. Also extending from the sleeve 43 is another bar 50 having on its second end a weight or ball 51. The bars 45 and 50 are preferably disposed on downward diverging inclines to provide an inverted lever of somewhat a V- shape, and the ball 51 with its bar 50 are of combined weights to counterbalance the bar 45, displacing body 41 and the temperature compensating strips 47, 48. The displacing body or air chamber 41 is of a weight whose specific gravity corresponds approximately to the specific gravity or density of a given liquid having a standardized specific gravity for establishing a recognized grade or quality value. For example, when the apparatus is used for testing gasoline of a standard specific gravity of 0.7 the displacing body is formed of a weight which will not be affected buoyantly by the liquid, but if the gasoline being tested is adulterated as by kerosene or other substance of different specific gravity the specific gravity of the gasoline mixture will vary accordingly, and the displacing body will then be raised or lowered by the buoyant effort of the liquid in the casing in conformity to the relative difference of its density.

In the box 23 of the casing 10 is an indicating device, as 52, for registering the specific gravity of the liquid flowing through the casing. This indicating device preferably includes a plate, as 53, of somewhat a rectangular shape having its lower part bracketed, at 54, on the top wall 13 of the casing interiorly of the box 23 so that one of its faces is exposed to view through the window 25 of the box. On the exposed face of the plate 53 is an arc-shaped scale 55 divided into equidistant measurements, as 56, such as symbols in the forms of spaced line markings for indicating the specific gravity or density of liquids. As shown, the central character or symbol is marked "0.7" for designating the standard specific gravity value of gasoline, and the characters or markings to the right and to the left of the marking "0.7" are designed to indicate whether the liquid being tested is of a lighter or heavier specific gravity. In the bracket 54 and in the rear wall of the box 23 is journaled the end parts of a shaft 57 having its forward end protruding beyond the exposed face of the plate 53 of the scale 55. On the protruding end of the shaft 57 is held the lower end of a pointer, as 58, which is of such a length that its other end is movable in proximity to the measurement markings or symbols 56 of the scale 55. On the shaft 57 is also a bevel gear 59 which is in mesh with a bevel gear 60 held on the upper end of a vertical shaft 61 which is journaled in the bearing 27 of the top plate 13 of the casing. At the lower end of the vertical shaft 61 is a second bevel gear 62 in mesh with a large bevel gear 63 held on the beam or shaft 38 of the counterbalanced displacing body, and in the lower end of the vertical shaft is a socket in which the pivot bolt 31 is seated for pivotally supporting the vertical shaft. The bevel gears 63, 62, 60, 59 are of such proportions that when the beam 38 is rotated by the raising and lowering movements of the displacing body 41 the shafts 61 and 57 will be revolved for moving the pointer 58 consecutive distances to the right or to the left of the guide mark "0.7" to a position corresponding with one of the measurements 56 of the scale 55.

In the bearing 32 of the bracket 29 is slidably disposed the upper end of the stem 64 having on its lower end a valve 65 which controls the opening and closing of the auxiliary outlet 20$^a$ of the duct 20 of the casing 10, and the lower part of the stem 64 of the valve is slidably disposed through the bearing 33 of the rear wall 12$^a$ of the casing. On the central part of the stem 64 of the valve 65 between the bearing 33 and the bracket 29 is a fixed collar or stop, as 66, and encircling the stem of the valve between the bracket 29 and the bearing 33 is a spiral spring 67 tensioned for normally forcing the collar 66 and stem 64 in a downward direction to keep the valve normally seated in closed position on the auxiliary outlet 20$^a$ for preventing liquid in the casing from flowing through the duct 20 to the outlet 17 of the casing. In the side wall 11$^a$ of the casing and in the curved partition 16 of the outlet 17 are registered bearings 68, 69 in which is journaled a shaft 70 of a length so that one of its ends extends beyond the side wall 11$^a$ of the casing and so that its other end terminates in proximity to the stem 64 of the valve 65. On the inner end of the shaft 70 is eccentrically held a cam disk, as 71, which is in movable engagement with the underside of the collar 66 of the stem of the valve 65. On the outer end of the shaft 70 is held one end of a handle, as 72, which extends movably upward. Protruding from the central part of the handle 72 may be an arm or pin 73 normally contacting with a lug or stop, as 74, projecting from the side wall 11$^a$ of the casing 10.

When the indicator or apparatus is used as in conjunction with a filling pump, as A Fig. 1, for supplying gasoline to a motor driven vehicle the inlet 15 is attached, as at B, to the pump and the outlet 17 may be connected to a delivery pipe, as C, so that the liquid will flow through the casing 10. When the casing is empty the position of the displacing body 41 is such that the pointer 58 will be in the position shown in Fig. 2. The inlet and outlet of the casing being relatively arranged, as above explained, a sufficient portion of the liquid will be retained in the casing when the valve 65 is closed on the auxiliary outlet 20$^a$ so that the displacing body 41, its strips 47, 48 and the weight 51 will be submerged in the liquid. If the gasoline is of standard specific gravity the displacing body 41 will be moved by the buoyant effort of the liquid to operate the gears 63, 62, 60, 59 with the shafts 61, 57 and the pointer 58 will move to a position as indicated in dotted lines, at D, which is the guide mark "0.7" of the scale 55. If the gasoline varies from its standard specific gravity of "0.7" it would ordinarily indicate that the liquid was of an inferior grade or was adulterated. The density of the liquid flowing through the casing would then cause the displacing body 41 to rise or lower accordingly, and the beam 38 would rotatively move. The gears 63, 62, 60, 59 with the shafts 61, 57 would in turn be operated for moving the pointer 58 for indicating on the scale 55 the relative difference of the specific gravity of the liquid so that the user may know the quality of the liquid. During cold and hot weather the specific gravity of most liquids, especially gasoline vary in specific gravity, and when the variation is caused by change of temperature the strips 47, 48 of the displacing body 41 will be affected and will contract or expand co-extensively for adjustably positioning the displacing body 41 on the bar 45 toward or from the beam 38. The beam 38, gears 63, 62, 60, 59 and the shafts 61, 57 will thereby be adjustably operated to retain the pointer 58 in its normal position at the mark "0.7" of the scale 55 to permit the testing process to be made in the usual manner.

When the flow of the liquid through the casing is stopped the retained liquid in the chamber 18 of the casing may be discharged by swinging the handle 72 and its pin 73 from the stop lug 74 of the casing. The shaft 70 and its cam 71 will thereby be rotated to raise the collar 66 against the tension of the spring 67 and the stem 64 will move upwardly for lifting the valve 65 from the auxiliary outlet 20$^a$ to allow the retained liquid to be discharged through the duct 20 to and through the outlet 17 of the casing. When the handle is released the tension of the spring 67 will cause these parts to reversely operate for reseating the valve 65 on the auxiliary outlet 20$^a$ for allowing the device to be subsequently operated.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A specific gravity indicator, comprising a casing having an inlet and an outlet relatively arranged for flow of liquid therethrough and for retaining a portion of the liquid during its flow, a slidable rotatively supported counterbalanced air chamber in the casing of a weight whose specific gravity is about equal to the specific gravity of the liquid when of a standard density, said air chamber being submerged in the retained liquid for being rotatively moved by the buoyant effort of the liquid when of a density varying from its known standard, means operative with the rotary movement of the air chamber to indicate the relative difference of density of the liquid, and means associated with the air chamber for being made effective by the influence of change of the standard temperature of the liquid to slidably adjust the air chamber for keeping the indicating means in its normal position at all temperatures of the liquid.

2. A specific gravity indicator, comprising a casing having an inlet and an outlet relatively arranged for flow of liquid therethrough and for retaining a portion of the liquid during its flow, a slidable rotatively supported counterbalanced air chamber in the casing of a weight whose specific gravity is about equal to the specific gravity of the liquid when of a standard density, said air chamber being submerged in the liquid for being rotatively moved by the buoyant effort of the liquid when of a density varying from its known standard, an indicator having means operative by the air chamber when rotatably moved for operating the indicator to register the relative difference of density of the liquid, and means associated with the air chamber for being made effective by the influence of change of the standard temperature of the liquid to slidably adjust the air chamber for keeping the indicator in its normal position at all temperatures of the liquid.

3. A specific gravity indicator, comprising a casing having an inlet and an outlet relatively arranged for flow of liquid therethrough and for retaining a portion of the liquid during its flow, an adjustable rotatively supported counterbalanced displacing body in the casing of a weight whose specific gravity is about equal to the specific gravity of the liquid when of a standard density, said body being submerged in the liquid and for being rotatively moved by the buoyant effort of the liquid when of a density varying from its known standard, an indicator, gearing co-operating with the body for operating the indicator to indicate the relative difference of density of the liquid, and means associated with the body for being made effective by the influence of change of the standard temperature of the liquid to adjust the body for keeping the indicator in its normal position at all temperatures of the liquid.

4. A specific gravity indicator, comprising a casing having an inlet and an outlet relatively arranged for a flow of liquid therethrough and for retaining a portion of the liquid during its flow, a slidable rotatively supported counterbalanced air chamber in the casing of a weight whose specific gravity is about equal to the specific gravity of the liquid when of a standard density, said air chamber being submerged in the liquid and for being rotatively moved by the buoyant effort of the liquid when of a density varying from its known standard, an indicator, gearing co-operating with the air chamber for operating the indicator to indicate the relative difference of density of the liquid, and means associated with the air chamber for being made effective by the influence of change of the standard temperature of the liquid to adjust the float for keeping the indicator in its normal position at all temperatures of the liquid.

5. A specific gravity indicator, comprising a casing having an inlet and an outlet relatively arranged for flow of liquid therethrough and for retaining a portion of the liquid during its flow, an adjustable rotatively supported counterbalanced displacing body in the casing of a weight whose specific gravity is about equal to the specific gravity of the liquid when of a standard density, said body being submerged in the liquid and for being rotatively moved by the buoyant effort of the liquid when of a density varying from its known standard, means providing in the casing an auxiliary outlet leading to the main outlet, a valve controlling the auxiliary outlet of the casing, means operative by the rotary movement of the body to indicate the relative difference of density of the liquid, means operative for moving the valve to open the auxiliary outlet of the casing, and means associated with the body for being made effective by the influence of change of the standard temperature of the liquid to adjust the body for keeping the indicator in its normal position at all temperatures of the liquid.

6. A specific gravity indicator, comprising a casing having an inlet and a main outlet relatively arranged for flow of liquid therethrough and for retaining a portion of the liquid during its flow, a slidable rotatively supported counterbalanced displacing body in the casing of a weight whose specific gravity is about equal to the specific gravity of the liquid when of a standard density, said body being submerged in the liquid and for being rotatively moved by the buoyant effort of the liquid when of a density varying from its known standard, means providing in the casing an auxiliary outlet leading to the main outlet, a valve controlling the auxiliary outlet of the casing, an indicator having means operative by the rotary movement of the body for operating the indicator to register the relative difference of density of the liquid, means operative for moving the valve to open the auxiliary outlet of the casing, and means associated with the body for being made effective by the influence of change of the standard temperature of the liquid to adjust the body for keeping the indicating means in its normal position at all temperatures of the liquid.

7. A specific gravity indicator, comprising a casing having an inlet and an outlet relatively arranged for flow of liquid therethrough and for retaining a portion of the liquid, a shaft journaled in the casing, two diverging rods depending from the shaft, a slidably adjustable displacing body on one of the rods and of a weight whose specific gravity is about equal to the specific gravity of the liquid when of a standard density, a counterbalancing weight on the other rod, said body being submerged in the liquid for being rotatively moved by the buoyant effort of the liquid when of a density varying from its known standard, an indicating device on the casing, means operative by the shaft when rotated by the movement of the body and its rod for operating the indicating device to register the relative difference of density of the liquid, and means associated with the body for being made effective by the influence of change of the standard temperature of the liquid to adjust the body on its rod for keeping the indicating device in its normal operative position at all temperatures of the liquid.

8. A specific gravity indicator, comprising a casing having an inlet and an outlet relatively arranged for flow of liquid therethrough and for retaining a portion of the liquid, a shaft journalled in the casing, a sleeve adjustably held on the shaft, two diverging rods depending from the shaft, a slidably adjustable displacing body on one of the rods and of a weight whose specific gravity is about equal to the specific gravity of the liquid when of a standard density, a counterbalancing weight on the other rod, said body being submerged in the liquid for being rotatively moved by the buoyant effort of the liquid when of a density varying from its known standard, an indicating device on the casing, means operative by the shaft when rotated by the movement of the body and its rod for operating the indicating device to register the relative difference of density of the liquid, means providing in the casing an auxiliary outlet leading to the main outlet, a spring pressed valve normally closing the auxiliary outlet of the casing, means operative for moving the valve to open the auxiliary outlet, and means associated with the body for being made effective by the influence of change of the standard temperature of the liquid to adjust the body on its rod for keeping the indicating device in its normal operative position at all temperatures of the liquid.

9. A specific gravity indicator, comprising a casing having an inlet and a main outlet relatively arranged for flow of liquid therethrough and for retaining a portion of the liquid, an inverted substantially V-shaped lever rotatively supported in the casing, a slidably adjustable displacing body on one of the arms of the lever and of a weight whose specific gravity is about equal to the specific gravity of the liquid when of a standard density, a counterbalancing weight fixed on the other arm of the lever, said body being submerged in the liquid for being rotatively moved by the buoyant effort of the liquid when of a density varying from its known standard, a shaft journaled in the casing, an indicating device on the casing, gearing operative with the rotary movement of said lever when operated by the movement of the body to operate the shaft for operating the indicating device to register the relative difference of density of the liquid, means providing in the casing an auxiliary outlet leading to the main outlet, a spring pressed valve normally closing the auxiliary outlet of the casing, means operative for moving the valve to open the auxiliary outlet, and means associated with the body for being made effective by the influence of change of the standard temperature of the liquid to adjust the body on its arm of said lever for keeping the indicating means in its normal operative position at all temperatures of the liquid.

10. A specific gravity indicator, comprising a casing having an inlet and a main outlet relatively arranged for flow of liquid therethrough and for retaining a portion of the liquid, a beam rotatively supported in the casing, an inverted substantially V-shaped lever adjustably held on the beam, a slidable adjustable displacing body on one of the arms of the lever and of a weight whose specific gravity is about equal to the specific gravity of the liquid when of a standard density, a counterbalancing weight fixed on the other arm of the lever, said body being submerged in the liquid for being rotatively moved by the buoyant effort of the liquid when of a density varying from its known standard, a shaft journaled in the casing, gearing operative by the rotation of the beam when operated by the movement of the body to operate the shaft, an indicating device on the casing, gearing also operative by the shaft for operating the indicating device to register the relative difference of density of the liquid, means providing in the casing an auxiliary outlet leading to the main outlet, a spring pressed valve normally closing the auxiliary outlet of the casing, means operative for moving the valve to open the auxiliary outlet, and means associated with the body for being made effective by the influence of change of the standard temperature of the liquid to adjust the body on its arm of said lever for keeping the indicating device in its normal operative position at all temperatures of the liquid.

This specification signed and witnessed this 12th day of November, A. D. 1925.

WALTER J. ALBERSHEIM.